United States Patent [19]

Gehrig

[11] Patent Number: 5,937,358
[45] Date of Patent: Aug. 10, 1999

[54] METHOD AND DEVICE FOR RADIO COMMUNICATION IN TRAFFIC GUIDANCE SYSTEMS

[75] Inventor: Josef Gehrig, Schwarzenbach, Switzerland

[73] Assignee: Häni-Prolectron AG, Bronschhofen, Switzerland

[21] Appl. No.: 08/836,879

[22] PCT Filed: Sep. 5, 1996

[86] PCT No.: PCT/CH96/00306

§ 371 Date: May 23, 1997

§ 102(e) Date: May 23, 1997

[87] PCT Pub. No.: WO97/12348

PCT Pub. Date: Apr. 3, 1997

[30] Foreign Application Priority Data

Sep. 26, 1995 [CH] Switzerland .......................... 02720/95

[51] Int. Cl.[6] .................................................. H04B 7/26
[52] U.S. Cl. .......................... 455/509; 455/517; 455/524
[58] Field of Search .................................. 455/11.1, 422, 455/507, 509, 510, 511, 517, 524; 370/375, 321, 326, 327, 249, 454, 455

[56] References Cited

U.S. PATENT DOCUMENTS

| | | |
|---|---|---|
| 3,644,883 | 2/1972 | Borman et al. . |
| 4,041,393 | 8/1977 | Reed . |
| 4,356,484 | 10/1982 | Eckhardt . |
| 5,710,764 | 1/1998 | Yoshimura .............................. 455/11.1 |
| 5,790,938 | 8/1998 | Talarmo .................................. 455/509 |

FOREIGN PATENT DOCUMENTS 2056820  3/1981  United Kingdom .

OTHER PUBLICATIONS

J. Gehrig, "Moderne Betriebsleitsystem Auf Basis Von Datenfunknetzen," *Verkehr und Techik*, Nr. 12, pp. 495–501 (1992).

C.L. Wiksten et al., "Monitor–An Automatic Bus Location and Communications System for Chicago," *Proceeding of Convergence 80*, 30th Annual Conference of the IEEE Vehicular Technology Society, International Conference on Transportation Electronics, pp. D4–2/1–6 (Sep. 1980).

*Primary Examiner*—Thanh Cong Le
*Attorney, Agent, or Firm*—Greenblum & Bernstein, P.L.C.

[57] ABSTRACT

A radio communication between central and peripheral units (LST, SUP, FZ, PAC, LSA) of a traffic guidance system which, in particular, is comprised of a master terminal (LST), vehicles (FZ) and passenger information systems (PAC) and optical signal units (LSA) to control the flow of traffic, which communicate with one another via at least two voice and two data channels (SK1, SK2, DK1, DK2) in such a way that messages are transmitted from the central unit (LST) to the peripheral units (FZ, PAC) via the first data channel (DK1) and correspondingly from the peripheral units (FZ, PAC) to the central unit (LST) via the second data channel (DK2). Further, the central and the peripheral units (LST, FZ, PAC) communicate via the first and the peripheral units (FZ) among one another at close range via the second voice channel (SK1 or SK2). The peripheral units (FZ) in normal operating condition are switched to the second voice channel (SK2) and, at the same time, participate in data communication on the data channels (DK1, DK2), so that in spite of intensive use of the short-range or voice channel (SK2) by the peripheral units (FZ), it allows smooth communication between the central and the peripheral units (LST, FZ, PAC, LSA).

16 Claims, 4 Drawing Sheets

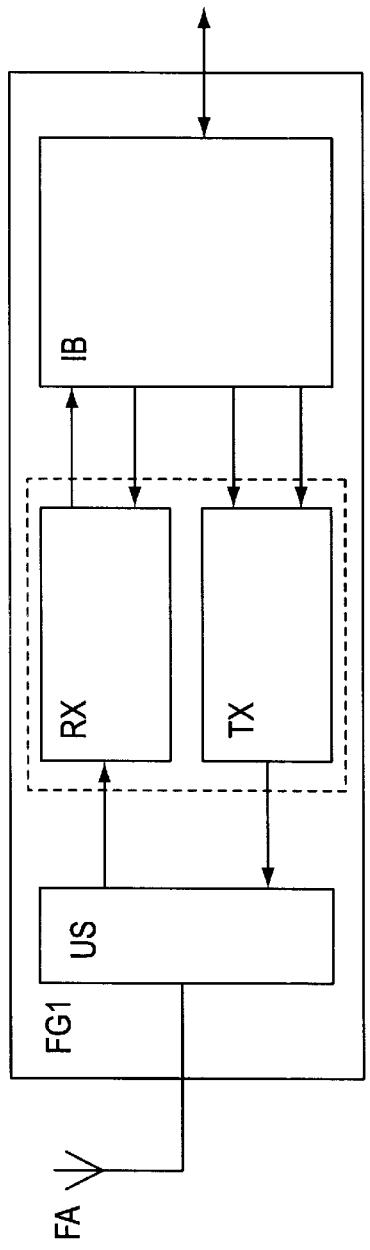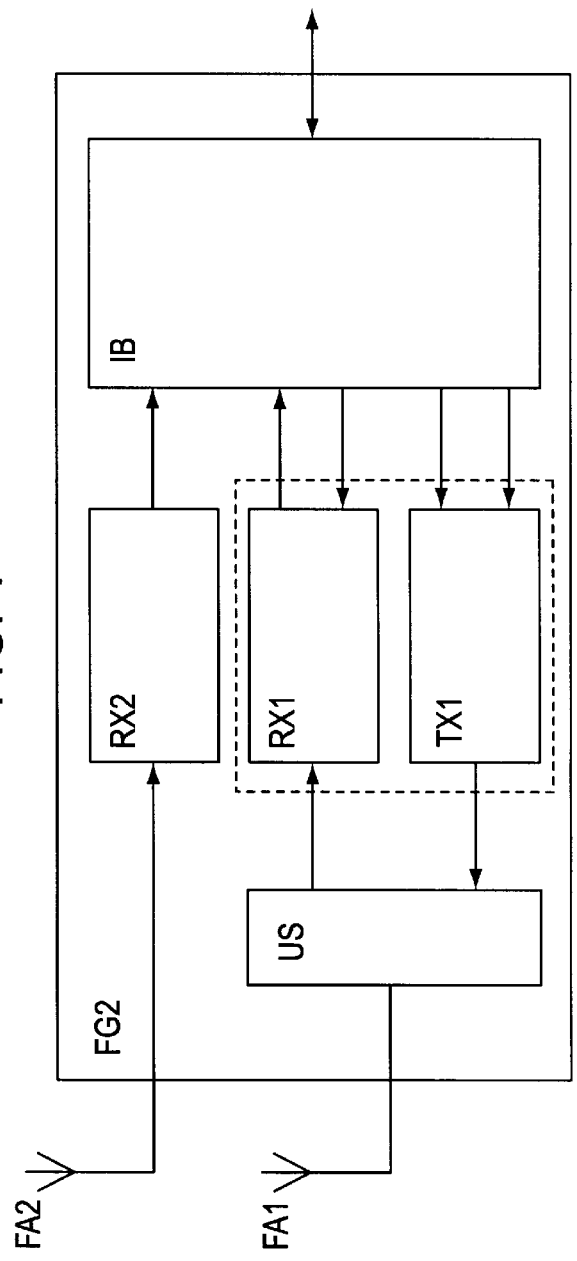

METHOD AND DEVICE FOR RADIO COMMUNICATION IN TRAFFIC GUIDANCE SYSTEMS

CROSS REFERENCE TO RELATED APPLICATIONS

The present application is a U.S. National Stage of International Application No. PCT/CH96/00306 filed Sep. 5, 1996, which claims priority under 35 U.S.C. §119 of Swiss Patent Application No. 02 720/95-9 filed Sep. 26, 1995.

BACKGROUND OF THE INVENTION

1. Field of the Invention

The present application is directed to a method and device for radio communication between central and peripheral units of a traffic guidance system. The central and peripheral units communicate with one another via at least a first and second voice channel and at least a first and second data channel. The central unit includes a master terminal and the peripheral units include at least one of vehicles and passenger information systems. The central unit transmits messages to the peripheral units via the first data channel, and the peripheral units transmit responses to the central unit via the second data channel. The central and peripheral units also communicate via the first voice channel, and the peripheral units communicate with each other via the second voice channel when they are located at close range to each other.

2. Discussion of the Background Information

To ensure the smooth performance of medium and large scale transportation companies, in particular, in public commuter transportation, state-of-the-art computerized operating guidance systems are used as described in "Moderne Betriebsleitsysteme auf Basis von Datenfunknetzen" [State-of-the-Art Operating Guidance Systems Based On Radio Data Networks] Verkehr und Technik, Special edition, Issue 12, Erich Schmidt Verlag, Berlin 1992 by Dr. J. Gehrig. Communication between the system units: the master terminal, vehicles and decentral control units, e.g., for influencing optical signal units which control the flow of traffic, is normally performed in real time via radio transmission. The point-to-point data transmission, for example, from a stationery point of the line to the vehicles, often takes place via IR connection. The radio network not only exchanges information between personnel at the master terminal and drivers, it also transmits information on optical and acoustical passenger at traffic junctions or stations. Conversations between personnel at the master terminal and/or the vehicles are usually transmitted analog via at least one voice channel. For controlling peripheral system units and for cyclic recording of actual operating data, digital messages are used which are converted into analog signals (modulation) and transmitted via at least one data channel. To optimize the procedure within the guidance system, decentral system-relevant information is retrieved and analyzed. Therefore, it is of importance to the master terminal to be in permanent contact with all system units, in particular, with the vehicles. In state-of-the-art traffic communication systems, preferably two data channels are provided between the central master terminal and the peripheral system units which enable permanent bi-directional radio-communication. A radio set provided in the vehicles may, for example, receives and responds to the switching commands transmitted in the first channel of the master terminal, which, for example, contain a call request. After receiving a spontaneous call or request, a response message is immediately transmitted via the second channel from the vehicle to the master terminal. From the master terminal current data can be retrieved by the same method from the peripheral system units. Further, if necessary, the radio sets contained in these peripheral system units are instructed to switch to a specific channel, in order to set up a radiotelephone connection. After termination of the call, a signal is issued from the master terminal via the used voice channel, causing the radio set to make the radio connection again via the two data channels. Further, there is the possibility of switching the radio set to another voice channel on which voice signals can be exchanged between system units at close range over short distances.

The disadvantage with these known systems is that the radio sets provided in the peripheral system units are largely running to capacity as a result of the monitoring the polling messages (polling operation) transmitted in the first data channel and, therefore, are not available for further use. If the radio sets provided in the peripheral system units are used alternatively for the transmission of voice signals in the voice channels provided for said transmission, the polling messages transmitted via the first data channel can no longer monitored.

SUMMARY OF THE INVENTION

It is the object of the present invention to provide a method and a device for communication in traffic guidance systems in that the data and voice channels reserved for traffic operation can be better utilized. At the same time, it must also be ensured that, in comparison to the known systems, practically no data loss will occur.

In accordance with the present invention, the peripheral units may be composed of at least one receiver and a transmitter, and the method may include switching to the second voice channel for normal operating conditions; allocating time slots in the first data channel; polling, in the allocated time slots, the peripheral units with the central unit via the first data channel; switching the receiver to the first data channel to receive the polling calls from the central unit; and switching the transmitter to the second data channel to transmit response calls to the central unit. Further, at least one of the peripheral units may include an additional second receiver permanently switched to the first data channel, and the method may further include receiving at the additional second receiver the polling calls from the central unit; and switching the transmitter to the second data channel to transmit response calls to the central unit.

Further, the present invention may also include peripheral units composed of at least one of vehicles and passenger information systems and the peripheral units may include a transmitter adapted to transmit messages to the central unit via the second data channel; a computer; and a receiver. The receiver and the transmitter may be switchable with exact timing to the second data channel when a call from the central unit via the first data channel is received. Upon receiving a call transmitted from the central unit via one of the second voice channel and the first data channel, the receiver and the transmitter are switched to the first voice channel, whereby a call between the personnel of the central unit and of the peripheral units is enabled. Further, the receiver and the transmitter are automatically switched to a normal operating condition in the second voice channel when no further information from the central unit exists.

The present invention also includes the peripheral units composed of at least one of vehicles and passenger information systems and the peripheral units may include a transmitter adapted to transmit messages to the central unit via the second data channel; a computer; and first and second receivers adapted to receive calls from the central unit, and the second receiver being adapted to permanently receive calls transmitted from the central unit via the first data channel. The transmitter may be switchable to the second data channel to respond to calls from the central unit on the first data channel. After receiving a call from the central unit, the first receiver and the transmitter are switchable to the first voice channel, whereby a call between the personnel of the central unit and the peripheral units is enabled. The first receiver and the transmitter are automatically switched to a normal operating condition in the second voice channel when no further information from the central unit exists.

As a result of the inventive measures, the utilization ratio of the data and voice channels available for traffic guidance systems is optimized. At the same time, an elevated utilization of the voice channels is achieved, without losing the data transmitted by the master terminal via the data channels.

BRIEF DESCRIPTION OF THE DRAWINGS

The invention is explained in the following by means of drawings. Of the drawings:

FIG. 4 shows a peripheral system unit for communication according to the device provided in the first method; and FIG. 5 shows a peripheral system unit for communication according to the device provided for the second method.

DETAILED DESCRIPTION OF THE INVENTION

Figure 1:
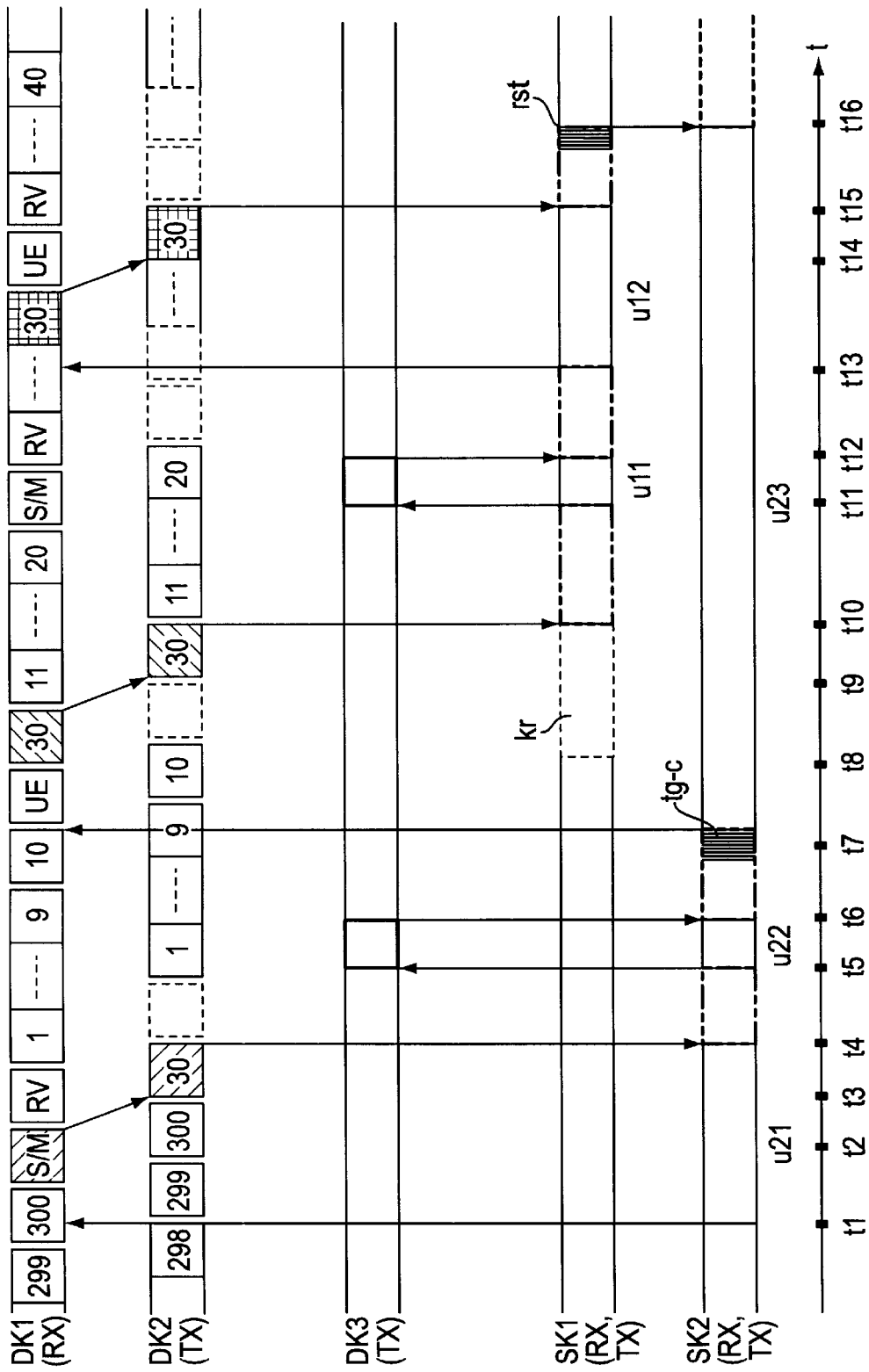
FIG. 1 shows the time sequence of radio signals which are transmitted according to the first method via various data and voice channels.

FIG. 1 shows the data sequences in a first and in a second data channel DK1, DK2, as well as the sequence of voice signals in a first and in a second voice channel SK1, SK2. In the first data channel DK1, data are transmitted from a central system unit, e.g., the master terminal LST shown in FIG. 3 to peripheral system units, e.g., to the vehicles FZ or passenger information systems PAC signalized to the system. As result of the data transmitted in a first data channel DK1, the vehicles FZ (or the other peripheral system units PAC) transmitted corresponding response data via the second data channel DK2 to the master terminal LST. The master terminal LST can also transmit the request to the vehicle FZ to switch to the first voice channel SK1, enabling a call between the master terminal personnel and the driver, without blocking the two data channels DK1 and DK2. After completion of the call, the master terminal LST transmits to the vehicle FZ via the first data or voice channel DK1 or SK1 the request for switching the channel. To enable the transmission of essential data during a call to the vehicle FZ or from the vehicle FZ to the master terminal LST, the subsequently described measures are initiated according to the invention. Of major importance for the smooth operation of data communication, is the second voice channel SK2 via which communication takes place mainly in the short range, e.g., between the drivers. According to the invention, this so-called short-range channel SK2 also is used to transmit information spontaneously and without delay from the master terminal LST to the vehicle FZ. As such great importance is attached to the short-range channel SK2, according to the invention, said channel is used as a standard or default channel, without losing messages for the vehicle FZ, which are transmitted in other channels. Following communication on other voice or data channel, the operation, therefore, is switched back to the short-range channel SK2. An exception merely is the change in channel which can occur during a call from the first voice channel SK1. In this case, the return to the short-range channel SK2 takes place only after completion of the call. The peripheral system units LSA, PAC, which are not provided for communication on the voice channels SK1, SK2, remain in normal operating condition during which no further information from the central unit LST exist, while said units are switched to receiving data transmitted on the first or other data channels DK1, DK3.

Basically, these conditions can be satisfied by the two inventive solutions described in the following:

In a first inventive embodiment, data transmission takes place in the time slot process on the first two data channels DK1, DK2. Each peripheral system unit FZ, PAC is allocated a time slot within which the relevant data are transmitted to the corresponding unit. In FIG. 1, for example, are provided time slots for 300 peripheral system units FZ, PAC which are polled in blocks of ten unit. Each polling block contains preferably twelve time slots of which the first is provided for transmitting event-specific information to one, several or all peripheral system units FZ, PAC. For example, the time slot allocation to all reported peripheral systems FZ, PAC takes place via the first time slot when starting the system or after a system interruption. Further, the group polling, which can be parameterized by the master terminal LST, can be transmitted via said first time slot. The second time slot, which enables the flexibilization of data communication is allocatable for random polling operations. The remaining ten time slots are provided for the selective polling of the peripheral system units FZ, PAC concerned. The thirtieth polling block, within which the communication to the peripheral system units FZ, PAC is generated with address numbers 291 through 300, closes the polling cycle. After logon, each of the 300 peripheral system units FZ, PAC are familiar with the time at which the master terminal LST will contact with said unit and, therefore, will have at its disposal the remaining cycle time (more than 99%) for transmitting voice signals to voice channels SK1, SK2. A radio set FG1 (see FIG. 4) provided in the peripheral system units FZ, PAC, which, among other things has a receiver and a transmitter RX or TX, normally operated in the short-range channel SK2 and for the duration of the time slot periodically changes to the data channels DK1 and DK2. As a polling cycle with, for instance, 300 radio partners may take a relatively long time (30*12 time slots * 0.05 seconds per time slot, this results in an 18 second period per time slot), a data exchange may be necessary between a peripheral system unit FZ, PAC and the master terminal LST. In response to the group polling (broadcast messages on the first data channel DK1, time slot S/M), which is transmitted to the first time slot within the polling block, the peripheral system unit FZ, PAC can transmit to the second data channel DK2 a message to the master terminal LST. This message can, for instance, be a request for communication between the master terminal LST and the peripheral system unit FZ, PAC via the first voice channel SK1. If, however, the master terminal LST desires to communicate with the peripheral system unit FZ, PAC via the first voice channel SK1, without waiting for the remaining cycle time, said unit transmits a message tg-c via the short-range channel SK2 to the peripheral system unit FZ, PAC concerned and causes said unit to switch directly to the first voice channel SK1 or temporarily to the first data channel DK1 for receiving. Not only during communication in the short-range channel SK2, but also during communication in the voice channel SK2, data may, if necessary, be transmitted sporadically via other data channels (e.g., data channel DK3) to other peripheral system units PAC, LSA. Requests for permission to pass addressed to optical signal units LSA (FIG. 3) are transmitted via the data channel DK3. Further, spontaneous departure messages from a vehicle FZ can be transmitted to the system units PAC via the data channel DK3.

FIG. 1 shows a possible communication sequence within the various data and voice channels, DK1, DK2, DK3, SK1 and SK2 for a vehicle with address number 30 (FZ30), which is equipped with a radio set FG1 according to FIG. 4.

Prior to time t1, the radio set FG1 of the vehicle FZ30 is switched to the voice channel SK2 for communication with other peripheral system units FZ which are located in the vicinity of the vehicle FZ30. For example, a driver who is overdue must notify the driver of a vehicle FZ, which is to make the connection, of the delay. Further, the driver is able to permanently obtain information on the traffic procedure in his immediate vicinity by listening in the short-range channel SK2. At the time t1, there exists the request for transmitting a message to the master terminal LST. Since the message is important, the driver should not wait for the remaining cycle time of maximum 18 seconds until the message has been transmitted to the master terminal LST. The receiver RX of the radio set FG1 is, therefore, switched at the time t1 to the first data channel DK1. Following detection of group polling from the master terminal LST (time t2), which takes place within the first time slot of the next polling block, the radio set FG1 transmits via the second data channel DK2 the urgent message (alarm, robbery, accident, etc.) in the associated time slot to the master terminal LST and subsequently (time point t4) switches back to the short-range channel SK2. Further, the acknowledgment of the message can be awaited on the first data channel DK1. The call interruption u21, as caused by the above-described process, corresponds in terms of length to approximately 5 time slots. At a subsequent time t5, a request message must be transmitted spontaneously via the data channel DK3, e.g., to an optical signal unit LSA. Upon broadcasting the message, at the time t6, the radio set FG1 is switched back to the short-range channel SK2. The call interruption u22 caused by this process corresponds in terms of length to approximately three time slots. At this time t7, the master terminal LST will contact the vehicle FZ30 and transmits for this purpose via the short-range channel SK2 a switch-over message tg-c which is addressed to the vehicle FZ30. In the described case, the radio set FG1 is initially to be switched over to the first data channel DK1 and later, following receipt of further instructions (time t8), to the first voice channel SK1. Following the acknowledgment of the message (time t9) transmitted by the master terminal LST, the radio set FG1 at the time t10 is switched over to the first voice channel SK1 on which the driver now is able to communicate with the master terminal personnel. Preferably, the voice channel SK1 is reserved prior to the call request by the master terminal LST (see reservation block kr). Between the times t11 and t12, a further request message is transmitted via the third data channel DK3 to an optical signal unit LSA as a result of which during approximately three time slots, an interruption u11 of the call occurs between the master terminal LST and the vehicle FZ30. At the time t13, the radio set FG1 switches to the first data channel DK1 to receive the vehicle-specific polling transmitted by the master terminal LST and acknowledges said polling at the time t14 and switches back to the voice channel SK1 at the time t15. The interruption u12 caused by this process corresponds approximately to the length of 5 time slots. At the time t16 the master terminal LST signals the end of the call and also transmits a change-back signal rst of several milliseconds of a specific frequency after which the radio set FG1 is switched back to the short-range channel SK2. The interruption u23 of communication in the short-range channel SK2, which began at the time t7, is dependent upon the duration of the call between the master terminal LST and the vehicle FZ30.

With low expenditure—only one radio set (see FIG. 4) is needed per peripheral system unit FZ, PAC—the inventive method can guarantee optimal use of the provided data channels SK, DK. The driver of the vehicle FZ30 is always well informed, as he receives messages via the short-range channel SK2, and he may be contacted periodically or spontaneously by the master terminal LST.

The inventive method thus allows data communication between the master terminal LST and the vehicle FZ during which the driver conducts a call via the first or the second voice channel SK1, SK2. The operating processes, for which sporadic or routine data transmission is required, thus are not influenced by channel switching from and to voice channels SK1 or SK2. For example, during the call, information text can be retrieved for passengers or operating data from the onboard computer (see FIG. 3 onboard computer IB) of the vehicle FZ.

By reducing the equipment expenditure in the peripheral system units FZ and PAC to a minimum, the described method and device, however, are unable to guarantee the elevated demands of desired flexibility at any time. As a result of the cyclic monitoring of the polling transmitted by the master terminal LST in the data channel DK1, once per polling cycle or once transmitted call block (time slot 2), time losses or undesired interruptions of communication occur in the voice channels SK1, SK2. Further, the message tg-c is transmitted via the short-range channel SK2 to the vehicle FZ only if the signal transmitted by the master terminal LST is adequately powerful in relation to other signals occurring in the short-range channel SK2. For this reason, the spontaneous data transmission from the master terminal LST to the peripheral system units FZ cannot be guaranteed at all times with this method and the corresponding device.

Figure 2:
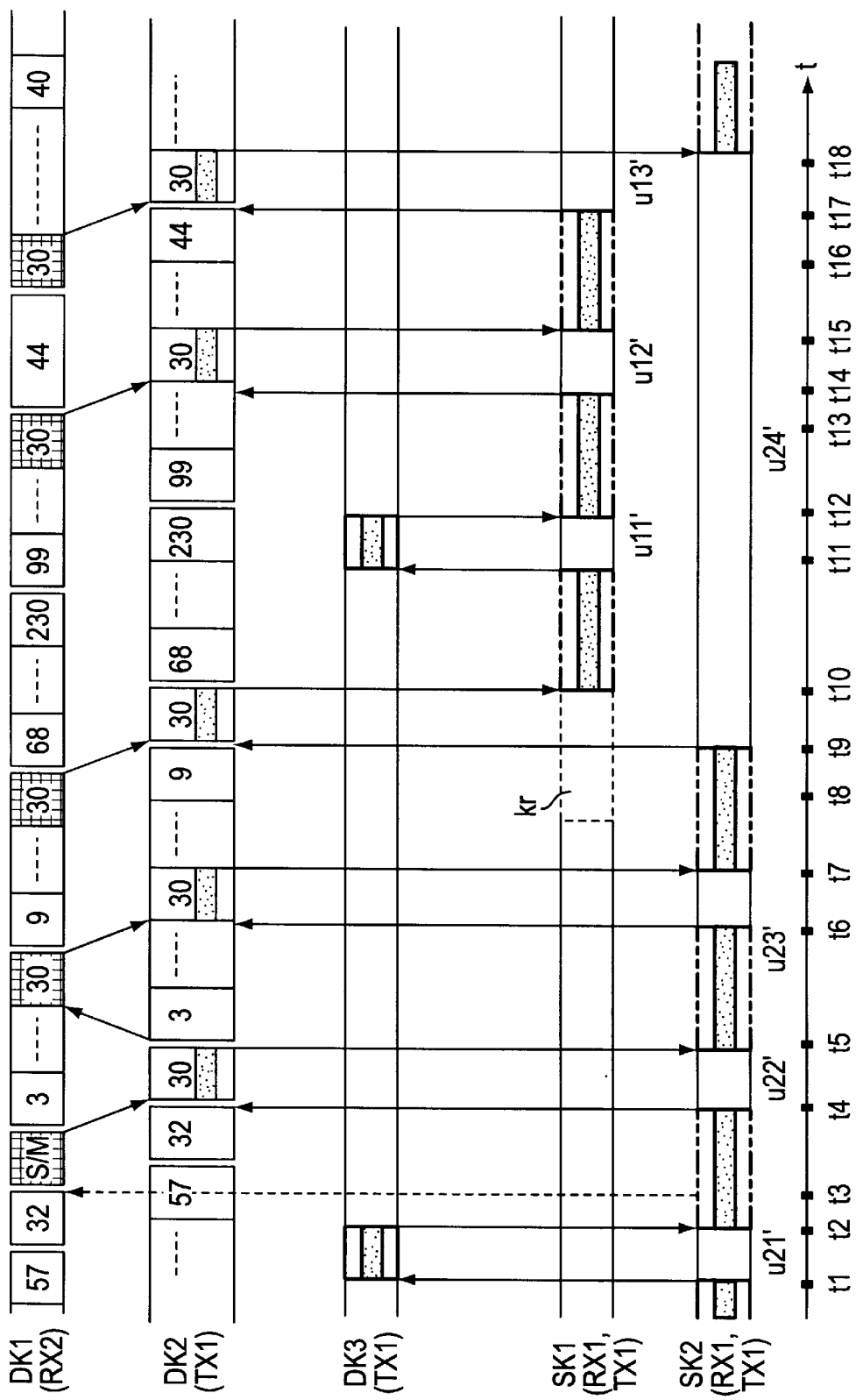
FIG. 2 shows the time sequence of radio signals which are transmitted according to a second method via various data and voice channels.

To reduce the described loss of time, the method described in the following by means of FIG. 2 is preferably applied, in that a radio set FG2 is required with two receivers RX1, RX2 and one transmitter TX1 (see FIG. 5). The first receiver RX1 is provided for receiving signals transmitted on the voice channels SK1, SK2. Via the second receiver RX2 are received simultaneous the same signals transmitted in the first data channel DK1. As a result, all interrogations transmitted by the master terminal LST are monitored by the peripheral system units FZ, PAC. The sequence of the peripheral system units FZ, PAC to be interrogated can be selected randomly and thus can be optimized in terms of operation. There is no rigid, cyclic transmission of the vehicle specific interrogations in allocated time slots. At preferably regular intervals, however, collective calls (S/M) are transmitted which are loaded by all peripheral system units FZ, PAC for transmitting important messages. Further, the master terminal LST may transmit via the first data channel DK1 information texts of preferably variable length which are transmitted to the peripheral system units FZ, PAC to be contacted. FIG. 2 shows that first the vehicles FZ are contacted with address number 57 and 32, subsequently a general poll is transmitted to all vehicles FZ, and then the vehicles FZ or other peripheral system units PAC with address numbers 3, 30, 9, etc., are called. The short-range channel SK2 is again used as standard or default channel in the peripheral system units FZ. The transmitter TX1 transmits data in the data channels DK2, DK3 or voice signals in the voice channels SK1, SK2, in necessary.

FIG. 2 shows a possible pattern of communications within the various data and voice channels DK1, DK2, DK3, SK1 and SK2 according to this second method, together with the extended radio set FG2 according to FIG. 5 for the vehicle with address number 30 (FZ30).

Prior to the time t1, the first receiver RX1 of the radio set FG2, which is provided in the vehicle FZ30, is switched for communication with short-range operating vehicles FZ to the short-range channel SK2. Between the times t1 and t2, a message is transmitted spontaneously via the transmitter TX1 on the third data channel DK3, e.g., to an optical signal unit LSA. The resulting call interruption u21' normally corresponds to the length of approximately three time slots. At the time t4, the vehicle FZ30 receives information which are to be transmitted to the master terminal LST. After receiving the general poll (S/M) detected by the second receiver RX2, the transmitter TX1 is switched to the data channel DK2 and transmits the message to be transmitted between the times t4 and t5. The transmission in the short-range channel is continued between the times t5 and t6, as well as later between t7 and t9. Between the times t6 and t7, the subsequent poll is answered by the master terminal LST. At a later time t8, the second receiver RX2 receives a call from the master terminal LST requesting it to switch to the first voice channel SK1. This request is acknowledged at a later time t9 by a response message via the second data channel DK2, whereupon, at the time t10 switching is done for transmission on the first voice channel SK1. The communication on the voice channel SK1 between the master terminal LST and the vehicle FZ30 is interrupted between the times t11 and t12 in favor of transmitting a request message via the third data channel DK3. At a later time t13, the second receiver RX2 receives a further call from the master terminal LST, which is acknowledged by the response message between the times t14 and t15. At the time t16, a further call is made in which the vehicle FZ30 is informed of the termination of the call. An acknowledgment of this call takes place between the times t17 and t18, after which the first receiver RX1 is switched back to the short-range channel SK2.

Figure 3:
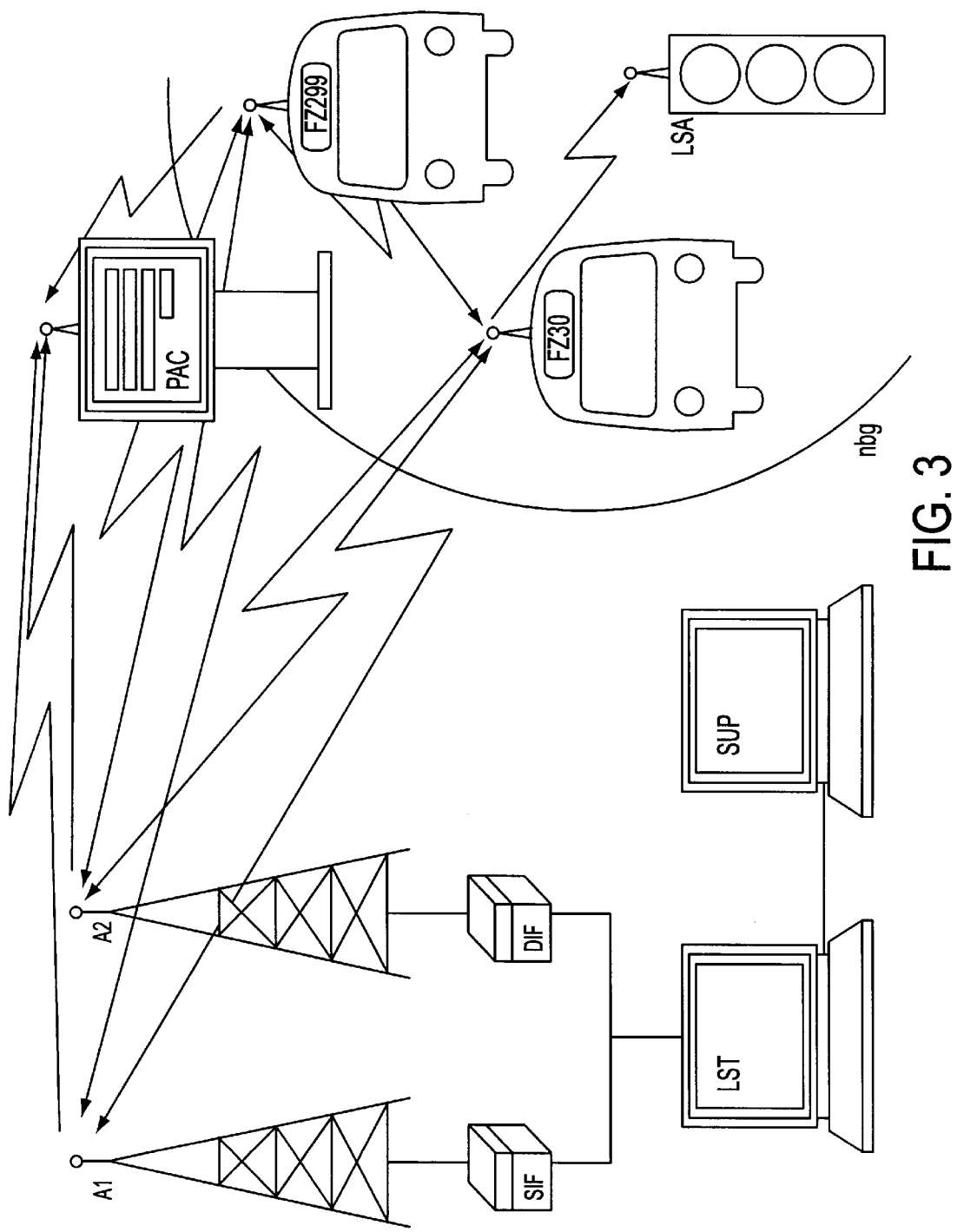
FIG. 3 shows an overview of the central and peripheral system units which communicate with each other according to the first or second method via data and voice channels.

FIG. 3 shows central and peripheral system units, LST, SUP or PAC, FZ30, FZ299, LSA of a communication system, which after the first or second method, if necessary, communicate with one another via the data and voice channels DK1, DK2, DK3, SK1, and SK2 according to the above described method. For transferring data, the system units LST, SUP or PAC, FZ001, ..., FZn preferably use the devices and modulation processes known from EP A 0 566 773. However, other devices are known to the expert, by means of which data and voice signals can be transmitted via the existing channels. The master terminal LST communicates with the peripheral system units FZ, PAC via the data channels DK1 and DK2 and, if necessary, via the voice channels SK1, SK2. The transmitter and receiver units of the radio computer SIF or DIF in the master terminal LST, which are connected with antennas A1 or A2, normally have a transmitting power corresponding to the transmitting power of the transmitters TX, TX1 which are provided in the peripheral system units FZ, PAC. The master terminal LST normally transmits with a common wave frequency and performs a diversity analysis of the received signals. These methods are already being used with several operational installations. The voice signals to be exchanged between the master terminal LST and vehicle FZ are transmitted via the antenna A1 in the voice channel SK1. For spontaneous contacting the vehicle FZ30 according to the first method, the master terminal LST transmits a message (tg-c) via the antenna A1 and the short-range channel SK2 to the vehicle FZ to be contacted. As the short-range channel SK2 normally is occupied by calls, the signal intensity of the call (tg-c) must clearly exceed the signal intensity of local calls. The transmitting power of the vehicle FZ and the walkie-talkie, which is necessarily used in the short-range channel SK2, is smaller by the factor 10 ... 100 than the transmitting power of the master terminal LST in the second voice channel SK2. The vehicles FZ30 and FZ299 located within the short-range area, as shown in FIG. 3 (see FIG. 3, short-range boundary nbg, for example, of the vehicle FZ299), can communicate with each other via the short-range channel SK2. Between intervals, the vehicle FZ30 transmits request messages via the data channel DK3 to the optical signal unit LSA, in order to cause switch-over to green light. Likewise, departure messages, for example, from the vehicle FZ299 for the direct control of passenger information systems PAC (e.g., transmission of a command for canceling a line display after departure of the vehicle FZ299), can be transmitted spontaneously on another data (e.g., DK3). The master terminal LST transmits polling messages via the radio computer DIF and the antenna A1 on data channel DK2 to all logged on peripheral system units FZ, PAC which return responses in the provided for time slots replays via the second data channel DK2. The data received for analysis by the peripheral system units FZ are transmitted to the central system unit SUP (statistics and planning), as a result of which the existing planning data are revised and optimized.

FIG. 4 shows the radio set FG1 provided for a peripheral system unit FZ, PAC for communication according to the first method, which is provided with a receiver and a transmitter RX and TX respectively which are connected via data and control lines with the onboard computer IB and can be connected via an antenna multiplexer or a change-over switch US with an antenna FA. By means of the onboard computer IB, which is provided with a modulation and demodulation unit, which, among other things, serves to control the modules provided in the vehicle FZ, the channel switch-over described in FIG. 1 is performed and data are output or entered as a result of the instructions received by the master terminal LST or the driver.

The radio set FG shown in FIG. 5 is provided with another receiver RX2 connected with an Antenna FA2 by means of which messages are monitored which are transmitted by the master terminal LST via the first data channel DK1, even if the receiver RX1 and transmitter TX1, which are interconnected via the change-over switch US with the antenna FA1, are switched to the operation in one of the voice channels SK1, SK2. With this second method, calls of the master terminal LST via the short-range channel SK2 are thus no longer necessary. Further, the onboard calculator configuration shown in FIG. 5 corresponds to that shown in FIG. 4.

The devices shown in FIG. 4 and FIG. 5 are preferably custom configured modular units. With large transportation systems, additional data and voice channels DK, SK may exist under certain conditions, between which the transmitters and receivers (RX, TX, or RX1, RX2 and TX1) are switched according to the above methods. For example, for communication between personnel of the master terminal LST and the vehicle FZ, switching may be possible to a third voice channel if, for example, the first voice channel SK1 is busy. Further, a fourth data channel can be provided if switch-over to the first receiver RX1 occurs periodically or if said channel is permanently monitored by a third receiver. Likewise, different vehicles FZ, e.g., rail vehicles, buses or taxis, can be allocated independent data and voice channels DK, SK.

The radio set FG1 or FG2 shown in FIG. 4 and FIG. 5, which is provided for the peripheral system unit vehicle FZ, has the minimal configuration of all elements which are required for radio communication according to the inventive method.

We claim:

1. A method for radio communication between central and peripheral units of a traffic guidance system, the central and peripheral units communicating with one another via at least a first and second voice channel and at least a first and second data channel, the central unit including a master terminal and the peripheral units including at least one of vehicles and passenger information systems, the method comprising:

transmitting messages from the central unit to the peripheral units via the first data channel;

transmitting responses from the peripheral units to the central unit via the second data channel;

communicating between the central and peripheral units via the first voice channel;

communicating between the peripheral units via the second voice channel when the peripheral units are located at close range to each other, wherein the peripheral units are composed of at least one receiver and a transmitter, and the method further comprises:

switching to the second voice channel for normal operating conditions;

allocating time slots in the first data channel;

polling, in the allocated time slots, the peripheral units with the central unit via the first data channel;

switching the receiver to the first data channel to receive the polling calls from the central unit;

switching the transmitter to the second data channel to transmit response calls to the central unit, wherein at least one of the peripheral units comprises an additional second receiver permanently switched to the first data channel, and the method further includes:

receiving at the additional second receiver the polling calls from the central unit; and switching the transmitter to the second data channel to transmit response calls to the central unit.

2. The method in accordance with claim 1, wherein the peripheral units further comprise at least one other data channel, the method further comprising:

switching the transmitter to the at least one other data channel, whereby a spontaneous transmission of one of messages or switching commands for one of influencing optical signal units and controlling passenger information systems occurs.

3. The method in accordance with claim 1, further comprising:

one of cyclically transmitting and transmitting within time intervals selective calls from the central unit for each peripheral unit;

detecting the selective calls in respective peripheral units; and sending one of return messages and status information from the respective peripheral units to the central unit via the second data channel.

4. The method in accordance with claim 3, wherein the time intervals are less than approximately 30 seconds.

5. The method in accordance with claim 3, further comprising:

transmitting, with the polling on the first data channel, operating information for synchronization of time slots from the central unit to the peripheral units.

6. The method in accordance with claim 1, further comprising:

transmitting, from the central unit, a call addressed to at least one peripheral unit via one of the second voice channel and via the first data channel;

switching the at least one peripheral unit to the first voice channel in response to the call addressed to the at least one peripheral unit, wherein a call between personnel of the central unit and of the peripheral units is enabled.

7. The method in accordance with claim 6, wherein the transmitting power of the transmitters for transmitting voice signals to the second voice channel is set to a value which is approximately 50 times smaller than transmitting power with which the central unit, via the second voice channel, transmits the calls for switching to the one of the first data channel and the first voice channel.

8. The method in accordance with claim 6, further comprising:

transmitting a switching command from the central unit to the peripheral units via the first voice and data channel;

terminating the call on the first voice channel;

after terminating, switching the receivers and transmitters of the peripheral units into a normal operating condition;

switching some of the peripheral units to receive in the second voice channel;

switching others of the peripheral units to receive in one of the first and the other data channel.

9. The method in accordance with claim 1, wherein n peripheral units do not include the another second receiver, the method further comprising:

reserving n time slots and permanently assigning the n time slots to polling blocks which are processed sequentially via the first data channel within a cycle in which all logged on peripheral units are polled.

10. The method in accordance with claim 9, wherein each polling block includes a time slot for group polling and at least one reserved time slot via which the peripheral units are polled.

11. A system for radio communication between central and peripheral units of a traffic guidance system comprising:

at least a first and second voice channel;

at least a first and second data channel;

the central unit is composed of a master terminal having a master transmitter adapted to transmit polls and switching commands to the peripheral units via the first data channel;

the central unit and the peripheral units being coupled for voice communication on the first voice channel;

the peripheral units being coupled for voice communication in a short range via the second voice channel; and the peripheral units are composed of at least one of vehicles and passenger information systems and the peripheral units comprising:

a transmitter adapted to transmit messages to the central unit via the second data channel;

a computer; and a receiver, the receiver and the transmitter being switchable with exact timing to the second data channel when a call from the central unit via the first data channel is received, wherein, upon receiving a call transmitted from the central unit via one of the second voice channel and the first data channel, the receiver and the transmitter are switched to the first voice channel, whereby a call between the personnel of the central unit and of the peripheral units is enabled, and wherein the receiver and the transmitter are automatically switched to a normal operating condition in the second voice channel when no further information from the central unit exists.

12. A system for radio communication between central and peripheral units of a traffic guidance system comprising:

at least a first and second voice channel;

at least a first and second data channel;

the central unit is composed of a master terminal having a master transmitter adapted to transmit polls and switching commands to the peripheral units via the first data channel;

the central unit and the peripheral units being coupled for voice communication on the first voice channel;

the peripheral units being coupled for voice communication in a short range via the second voice channel; and the peripheral units are composed of at least one of vehicles and passenger information systems and the peripheral units comprising:

a transmitter adapted to transmit messages to the central unit via the second data channel;

a computer; and first and second receivers adapted to receive calls from the central unit, and the second receiver being adapted to permanently receive calls transmitted from the central unit via the first data channel;

the transmitter being switchable to the second data channel to respond to calls from the central unit on the first data channel;

wherein, after receiving a call from the central unit, the first receiver and the transmitter are switchable to the first voice channel, whereby a call between the personnel of the central unit and the peripheral units is enabled, wherein the first receiver and the transmitter are automatically switched to a normal operating condition in the second voice channel when no further information from the central unit exists.

13. The system in accordance with claim 12, further comprising an additional data channel, wherein, during normal operating condition in which no additional information from the central unit exists, at least the first receiver of the peripheral unit composed of the peripheral passenger information systems is adapted for receiving data transmitted in at one of the first data channel and the additional data channel.

14. The system in accordance with claim 12, further comprising at least one other data channel, the transmitters being switchable for spontaneous transmission of one of messages or switching commands to the at least one other data channel.

15. The system in accordance with claim 14, the transmitting power of the transmitters for transmitting voice signals on the second voice channel are set at a value which is approximately 50 times smaller than transmitting power of the central unit call for switching to one of the first data channel and the first voice channel via the second voice channel.

16. A method for radio communication between central and peripheral units of a traffic guidance system which communicate with one another via at least a first and second voice channel and at least a first and second data channel, the central unit including a master terminal and the peripheral units including at least one of vehicles and passenger information systems, the method comprising:

transmitting messages are transmitted from the central unit to the peripheral units via the first data channel and from the peripheral units to the central unit via the second data channel;

communicating between the central and peripheral units via the first voice channel;

communicating between the peripheral units via the second voice channel when the peripheral units are located at close range to each other, wherein the peripheral units are composed of at least one receiver and a transmitter, and method further comprises:

switching to the second voice channel for normal operating conditions;

allocating time slots in the first data channel;

polling, in the allocated time slots, the peripheral units with the central unit via the first data channel;

switching the receiver to the first data channel to receive the polling calls from the central unit; and switching the transmitter to the second data channel to transmit response calls to the central unit.

* * * * *